Figure 1:
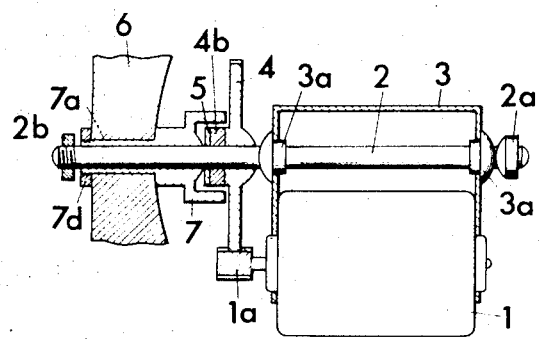

United States Patent [19]

Mabuchi

[11] 3,744,180

[45] July 10, 1973

[54] PROPELLER DRIVE MECHANISM FOR A MODEL AIRPLANE

[75] Inventor: Kenichi Mabuchi, Tokyo, Japan

[73] Assignee: Mabuchi Motor Co., Ltd., Tokyo, Japan

[22] Filed: Dec. 2, 1971

[21] Appl. No.: 204,038

[30] Foreign Application Priority Data
Dec. 3, 1970   Japan.............................. 45/106297

[52] U.S. Cl.................. 46/78, 46/243 AV, 192/46, 192/105 BB, 416/169
[51] Int. Cl....................... F16d 41/00, F16d 43/14
[58] Field of Search.................. 192/105 BB, 42, 46, 192/103 B, 71; 416/169; 46/78, 243 AV

[56] References Cited
UNITED STATES PATENTS

| 233,637 | 10/1880 | Passmore | 192/46 |
|---|---|---|---|
| 2,333,007 | 10/1943 | Heintz | 192/46 |
| 1,466,394 | 8/1923 | Fornaca | 192/42 X |
| 268,471 | 12/1882 | Elliott | 192/46 X |
| 2,025,239 | 12/1935 | Henning | 192/46 X |
| 2,330,677 | 9/1943 | Canfield | 192/46 |

Primary Examiner—Benjamin W. Wyche
Attorney—Staas, Halsey & Gable

[57] ABSTRACT

A propeller drive mechanism for a model airplane is disclosed, wherein a guide plate with guide grooves is rotatably mounted on a shaft in coupling with an output shaft of a drive motor, and clutch pins are fitted into the guide grooves so that the clutch pins may be protruded under the effect of centrifugal force. A clutch member to which a propeller is secured has shoulders for engaging with the clutch pins in their protruded position to receive drive force and a cam face for rendering the clutch pins inoperative to the clutch member.

1 Claim, 4 Drawing Figures

PATENTED JUL 10 1973   3,744,180

PROPELLER DRIVE MECHANISM FOR A MODEL AIRPLANE

The present invention relates to a propeller drive mechanism, and more particularly to a propeller drive mechanism for a model airplane which is applicable to any type of power source such as rubber resilient power, electric motor, gasoline engine or the like.

It is an object of the present invention to provide a propeller drive mechanism in which power is automatically and positively transmitted and the transmission of the power is automatically shut off simultaneously with the halt of a power motor.

It is another object of the present invention to provide a propeller drive mechanism for a model airplane which has a very small frictional resistance during driving and effects smooth driving of the propeller.

It is other object of the present invention to provide a propeller drive mechanism for a model airplane which is simple in structure, economic to manufacture, fail-safe, and durable over extended period.

According to the present invention, the above and other objects of the present invention is accomplished by a propeller drive mechanism for a model airplane wherein a guide plate having a guide grooves thereon is rotatably mounted on a shaft and coupled to an output shaft of a drive motor, clutch pins which are adapted to be protruded under the effect of centrifugal force are fitted into said guide grooves, and a clutch member to which a propeller is attached is formed with shoulders which engage with the clutch pins when the latter are protruded to receive drive power and a cam face for rendering the clutch pin inoperative to the clutch member.

Figure 2:
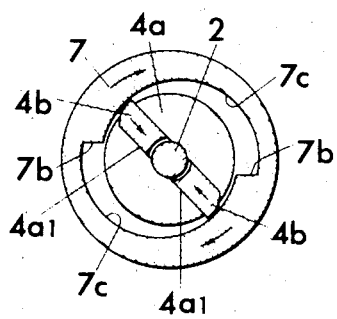
Figure 3:
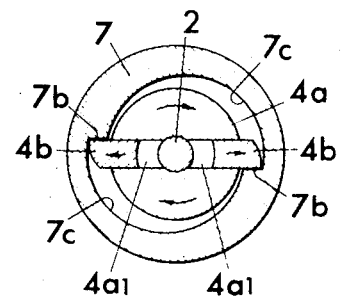
Figure 4:
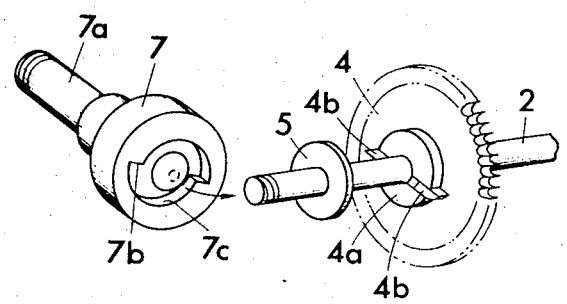

A preferred embodiment of the present invention will now be described in more detail with reference to the accompanying drawings, in which;

FIG. 1 is a longitudinal section view of a preferred embodiment of a propeller drive mechanism for a model airplane in accordance with the present invention, FIG. 2 and FIG. 3 are enlarged sectional views illustrating clutch portions, and FIG. 4 is an exploded perspective view of major parts.

In the drawings, a miniature electric motor 1 is fixedly mounted on a frame 3 secured to the body of model airplane (not shown) in an appropriate manner. A shaft 1' of the motor projects through the frame 3 and has a pinion 1a fixedly mounted thereon at its end. A shaft 2 is rotatably supported on the frame 3 in parallel with the motor shaft 1' by means of thrust bearings 3a. The shaft 2 extends at one end outwardly from the frame 3. A gear wheel 4 is rotatably mounted on the shaft 2 and meshed with the smaller toothed wheel 1a. The gear wheel 4 has a guide plate 4a integrally connected on one side of the gear wheels 4. The guide plate 4a has two guide grooves $4a_1$ extending radially outwardly from the center thereof. It should be understood that the number of the guide grooves $4a_1$ need not be two but it may be three or four or even one provided that a balance requirement is met. The reference numeral 4b represents clutch pins, which are slidably fitted into said guide grooves $4a_1$.

Each clutch pin 4b has at one end a concaved groove to be in contact with the outer face of the shaft 2 and at the other end forms a tip end and a concaved and inclined face downwardly extending therefrom, the inclination being made in a direction contrary to the rotation of the gear wheel 4.

A disc 5 is mounted on the shaft 2 such that it contacts the guide plate 4a face to face to cover the guide grooves $4a_1$. A propeller 6 is mounted on the sleeve 7a which is fixedly secured by a nut 7d threadedly engaged with the threaded end of the sleeve and against a shoulder formed in the sleeve 7a. A clutch member 7 is integrally connected to the sleeve 7a and has an inner surface. The inner surface has a shape composed of two semi-circular cam faces 7c and two shoulders 7b connecting the faces. The number of the cam faces 7c and shoulders 7b may be changed in accordance with the number of the guide grooves $4a_1$ and the clutch pins 4b.

Nuts 2a and 2b are threadedly engaged with the shaft 2 at its opposite ends to secure the mounted elements therebetween.

With the construction described above, as the small-size motor 1, the gear wheel 4 is rotated through the pinion 1a. The rotation of the gear wheel 4 causes the clutch pins 4b, which were fitted into the guide grooves $4a_1$ of the guide plate 4a, to be protruded radially outwardly, as shown in FIG. 3, under the effect of centrifugal force so that the tip ends of clutch pins 4b abut against the shoulders 7b of the clutch member 7 to thereby drive the propeller 6. When the rotation of the miniature electric motor 1 is stopped, the rotation of the gear wheel 4 is also stopped and the propeller 6 continues to rotate by its inertia force and air resistance. However during the first complete rotation of the propeller 6 after the halt of the rotation of the gear wheel 4 the clutch pins 4b are pushed back radially inwardly by the cam face 7c to assume the position shown in FIG. 2. If the outer end of the clutch pins has the convexed and inclined surface as described above and shown in the drawing, linear contact with the cam face 7c is provided, which results in further decrease of frictional resistance.

As described above, by the use of the clutch pins adapted to be protruded under the effect of centrifugal force and by the fact that the drive power is transmitted through the engagement of the protruded pins with the shoulders of the clutch member, the transmission of the drive power can be effected automatically and positively and it can be automatically interrupted simultaneously with the halt of the motor rotation with a very small frictional resistance after interruption. Namely, if the tip ends of the clutch pins rest at deep points in the camming groove no frictional resistance occurs there and even when they rest at relatively shallow points frictional resistance is very low permitting smooth drive of the propeller.

Thus, it will be clear to those skilled in the art that the propeller drive mechanism as setforth hereinabove accomplishes all of the objects stated above. The reference to Japanese Pat. Application No. 106019/70 will be appreciated, the invention of which is an essential basis of a series of my investigations with respect to model airplane to which series of my investigations the present invention belongs.

What is claimed is:

1. A propeller driving mechanism for a model airplane, comprising:
   a motor;
   a shaft mounted to the model airplane for rotation;

a gear wheel fixedly mounted to said shaft, means operably connecting said gear wheel and said motor such that said shaft is driven by said motor;
a guide plate mounted to said shaft adjacent said gear wheel, said guide plate including oppositely disposed grooves extending outwardly from said shaft to the outer periphery of said guide plate;
clutch pins slidably mounted within said grooves; and
a sleeve operably mounted for rotation about a portion of said shaft, a propeller fixedly mounted to said sleeve, a clutch member formed as a part of said sleeve, said clutch member being provided with a cavity within which said guide plate fits, said cavity comprising opposed cam faces interrupted by opposed shoulders such that as said motor drives said shaft said clutch pins move outwardly under the influence of centrifugal force engaging and locking with said shoulders of said clutch member causing said sleeve and propeller to rotate.

* * * * *